7471X
M. Mettee,
Pump Brake,
Patented Mar. 9 1833.
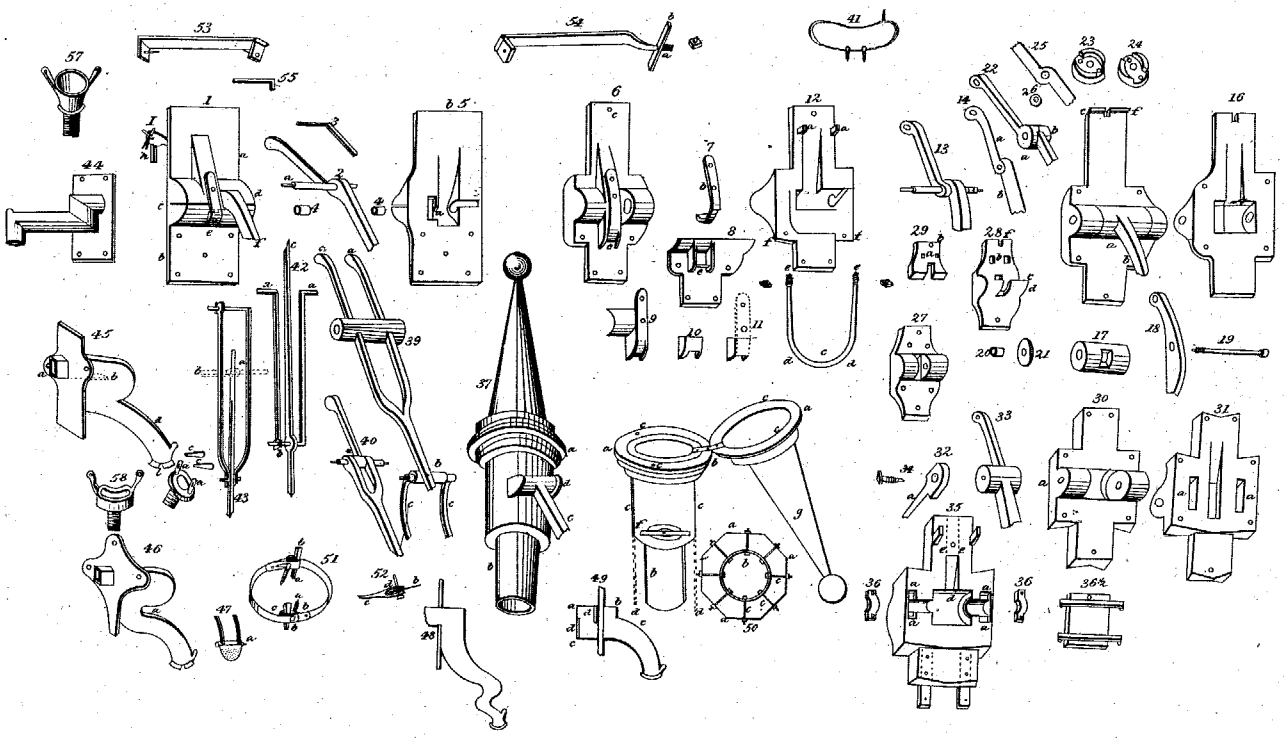
N. PETERS, PHOTO-LITHOGRAPHER, WASHINGTON, D. C.

7471X

Mar 9, 1833 No 13

Martin Mettee of Baltimore State of Maryland
Letters Patent.

The schedule referred to in these Letters Patent and making part of the same, containing a description in the words of the said Martin Mettee, himself of his improvement in Pumps To all to whom these presents shall come, Be it known, That I. Martin Mettee of the City of Baltimore & State of Maryland, have invented a new and useful improvement in the Pump. & that the following is a full and exact description of the construction and operation of the said machine or improvement as invented by me, ——

Fig 1. is a piece in my former Patent (which bears date of the twentieth day of May, one thousand and eight hundred and thirty) representing a fulcrum box attached to the pump stock, in which box the handle rests & operates. a.b. are two plates which join at the line c. d, by the hinge at e f. is a section of the handle g. is the end of the neck receiving h, which is a section of the spear with a key, ——

Fig 2, also of the former Patent is a section of the handle as f. & g. Fig. 1. with the pin a, - The neck and pin are welded together forming one solid piece: the pin being shouldered square at the right & the handle driven on Fig 3. of former Patent, is a section of the upper end of the spear, bent at a right angle, and prepared to pass thro' the eye, as at Fig 1. —— Figs 4, 4. of former patent, are hollow friction rollers adapted to the ends of the pin Fig 5. of former patent, is the inside view of the fulcrum box Fig 1. without the handle & neck.

Fig 6. is an improvement on Fig 1. the mortise thro' which the handle passes being so altered as to leave out the flange a. Fig 5. & to admit the left side of the handle at the pin to come 7471x Mar 9, 1833 in a line with the right side of the neck, c. is a hook instead
of the hinge a. Fig 1. for more ready direction / Fig 7. the hook
detached, — Fig 8. section of Fig. 6. c. shows a bolt to
receive the hook Fig 7. — Fig. 9. shows a variation of Fig
7. 8. — Fig 10 a section showing a bridge e. as a substitute
for the bolt e, Fig. 8. — Fig 11. the same as fig. 9. — Fig. 12.
inside view of Fig. 6. without the flange a, fig 5. — Fig 13
section of the handle and neck, adapted to fig 6, — the left side
of the handle being in a line with the right side of the neck, the
two forming one solid piece, with the pin drove in, in the original
plan the handle & neck, being two distinct pieces, were subject to
give way or come loose, — Instead of the left side of the
handle being in a line with the right side of the neck, the form
may be reversed by the box being formed accordingly
Fig 14 side view of Fig 13. — a, on the upper side of the neck
being in a line with (or a little lower than) b, on the lower
side of the handle; the object of which is to prevent the neck
from striking against the inside of the box
Fig 15, a variation of Fig 6, consisting of one solid piece
Fig. 16 inside view of Fig. 15. without the handle.
Figs 17 & 18 correspond with a b. Fig 15, Fig. 17. is a
cylinder thro' which the neck of the handle Fig. 18. passes
the bolt Fig. 19. enters at c, 15 passes thro' a b. 17. 18, and
comes out at d. 15..... Fig. 20 is one of two rings or
rollers which fit loosely in each end of the cylinder 17. Fig 21
is one of two washers at each end of 17. — Fig 22. is a variation
of a, b. 15, a, b. two pieces as Figs 23. 24. one of which being
a counter part of the other, formed to receive the section of the
neck, and handle 25, Fig 26. is a ring or roller adapted
to the hole in 25, the pieces 23. 24 and the handle are
bound together by rivets as seen at the dots in 22, Fig 27.
a variation of Fig. 6. intend to dispense with the hook, — It
consists of two pieces Figs 28. 29. 29. is taken from 28, & turned 7471X Mar 9, 1833 over showing two small projections, a. which fit into the mortices. b and
which by means of the dovetail in the joint of the two pieces 28. 29. the
outer edge of the projection c, of the piece 28, being formed so as to
prevent the piece 29. from coming out without its being first
pulled outwards, at the top, and then lifted upwards to detach
it from 28. the front part of the bed in which the pin rests extends
up about two thirds of the diameter of the pin, thro' the hole of 29 &
28. a bolt passes to bind the pieces together, Fig. 30 is a variation
of 15, Fig. 31. is 30 turned over, a. a. mortices which receive
two pieces, one of which is represented at Fig. 33. which is a
nut with a shank, a, drove or screwed into or thro' the stock, Fig. 32 is a variation of 17 & 18. consisting of one solid
piece, having pivot holes at each end to receive the points
of two screws one of which is seen at Fig. 34. which passes in
-to the hole a, Fig 30. thence thro' 32, which has a screw hole in it
adapted to the screw bolt 34 which is retained & partly sup
-ported by 32, The pivot and the hole in which it plays is
a substitute for the pin and journals, Fig 35. is an inner view
of a variation of Fig 15. the part of the plate next to the stock and
back of the journals of the pin is taken away & the journals are
kept in their places by the vertical caps, 36. 36. which are
partly sunk into the stock and partly into the mortices a, a.
& a, a, b. b, pieces riveted to or cast on the main plate
and are intended to set into one or more staples fitted into a
plate, which plate is fastened horizontally across the stock,
The dotted lines 35, represent a slot extending to d, which may
be cut entirely out of any of the pieces similar to it. in which
case the piece 36½ is intended as a door or cover for the slot
& it may be secured by hinges catches or other fixtures.
Fig. 37, represents a hollow metal top to the stock; con-
sisting of two pieces joined at the flanges a. a. or the flanges
a. a, Fig. 38 b. 38, a hinge c. c. c. c, holes to receive screw
bolts, b. 37. the part which sets into the top or bore of the 7471x Mar 9, 1833 stock, The holes in the part b, receive screw bolts to bind the stock
to that part. The dotted lines d d. 38, represents a continuation
of the sides c, c, when the part b. 37, or b, 38 is not attached in which
case the stock will be embraced by the lines d. d, the top &
stock will be bound together by screw bolts as before [illegible] c.
37. a handle &c. as 38, any of the others may by adaptation be
applied d, the projection or seats for the pin or shafts of the
handle which may be placed higher up or immediately at
the connection of the flange in which case the neck will play
within the hollow of the cap. Fig. 39. 40. are varied forms
of the handle and neck, c. c. 39. springs supporting a roller b,
against which the handle strikes, to give an easy reaction. the
feet of the spring are fastened to the stock F. 41 above 12, is
a form of a spring for the same purpose — Either this form, a
circle, an ellipsis or any other form would answer a good pur
pose Fig 42 is a section of a pump spear. a, a. parts of
the pitmen adapted to the necks a. a. of 39. b. the working
connection of the pitmen & the spear, Fig 43. another form
of the pitman and spear, adapted to fig 40, or any other
of the single necks a. 43. is the top of the spear, passing
thro' a plate b, which is also seen at f 38. the plate may
contain two or more plain or grooved rollers to guide the
spear, c 42. is a section of the spear which is designed to pass
thro' the plate crossing the hollow of the cap. as seen at g 38

Fig 44 a cast iron spout of my former Patent, the pecu
liarity of which is that it may contain either one or two gra
tings one in the nozzle, cast in it. about one inch up, the
other at the back within the stock, — The spout also contains
two semicircular pieces, each of which half or about half
closes the passage standing on opposite sides about two
inches apart within the stock, — [illegible]

Fig. 45 a new form of a spout with a four square passage
the dotted lines from a. b b. represent a slide within the passage 7471x Mar 9, 1833 which may be solid to b, or it may extend thro' to c, with a grating and the slide may be ~~perforated~~ with holes between a, & b, a, is a grating suspended by hinge and may be used as a substitute for the slide. Fig. 46. another form of the spout having a curve as at a, giving a freer vent to the fluid having the inner fixtures similar to those of 45.

Fig 47. a cullender cap fitting over or within the nozzle (3) of the spout secured by a bolt as at a, to be used when the slide & gratings at 45. are not applied, Fig 48, another form of the spout. Fig. 49. another form of the spout with a passage square from a, to b; from b. to c, is a grating d, d, solid perforated or grated plates. e. a suspended grate, a, a, a, in Fig. 50. represents the stock or head of the pump. the part b. is a broad ring in the bore of the stock c, c, & c, screw bolts binding the stock to the ring.

Fig. 51. a straining band embracing the pump-stock a. a. bolts passing thro' the band into the pump b. b, key wedges, each of which passes thro' between the bend at the end of one piece of the band, and the bolt Fig 52, a vertical section of another form of the joint of the band b. is the same as b. of 51; c. is the same as c. 51. except the addition of the branch, d, which embraces the key and bent-end d, — Fig 53. a piece in the former Patent which secures the ball-cap to the pump Fig. 54 another form for the same object; a, and b, screw & plate as substituted for the knee a 53, the screw at a 54 may enter the hole c, in the box Fig. 6. & be secured by a nut It may also drop into the slot, at the top of 15 or 16. in this case the plate b. 54 will crop under the flange, from e, to f. in Fig. 15, — The plate 54 may be let into the head of the stock near the bore, and as a substitute for the screw a, there may be a screw bolt passing thro' the hole c, Fig. 6 into the plate b. Fig. 55, of the former Patent, was attached to the cap, & hooked over the upper end of the box as at b. Fig. 6.

7471X Mar. 9, 183 the bow c, under Fig 13. is intended to secure the box to the pump & to bind the stock, the bow from d. to d, passes round the pump but the parts between d. e, & d, e, pass thro the sides of the stock & thro the holes f. f. and are secured by nuts, this bow, may also be applied to secure the spout, and bind the stock at 45 or 46, In my former Patent I employed screw bolts to prevent the stock from splitting, one was placed across just above the spout one just under the handle mortice; & one in each of the remaining angles just above, these bolts were simply screwed into the wood; which by reason of their rusting could not afterwards be tightened, — I now place one bolt across the mortice about two inches below the cap. which not only prevents the mortice from spreading but serves as a check, for the neck of the handle, The remaining bolts are situated as they originally were In applying the bolts, I now make the holes considerably larger than the bolts, & insert into the wood a plain nut for the head of the bolt, to rest or turn against and insert another with a screw for the screw of the bolt to lodge into a. a. Fig 12. projections which enter into the stock on each side of the handle mortice to prevent the upper part of the fulcrum box from playing or moving upwards by the motion of the handle as well as to brace the timber & to retain the mortice to its original width, Fig 56. is an apparatus by which the fire hose may be supplied with water by the pump a. a. are shanks which pass up thro the cut b, by the sides of the nozzle; the key c. c, pass thro the holes in the upper end of the shanks and rest on the flange of the nozzle and bind all firmly together, Fig. 57 is for the same purpose applicable to spouts with nozzles similar to those of 44. 45. &c having a funnel mouth it is attached to the spouts by means of straps of iron rivetted on Fig 58, is also an instrument for the same purpose adapted to the common wooden spout, I likewise at 7471x Mar 9, 1833 a screw in the nozzle. I also apply the common hydrant plug or
any other suitable one may be applied to any part of the pump
for the purpose of supplying the Hose, a friction ring as
26. may also be applied to the eye of the neck & joint of the
Spear, — After a careful examination I believe the impro
vements embraced in these drawings & descriptions to be my
own invention, yet I wish it to be distinctly understood that
I claim nothing in either the principle, or the application which
shall not prove to be my own & new, Witnesses
I. B. Bosley }
Edward Talbott } Martin Mettee Ex
(Dr in port folio) Ch 2/52 wd